United States Patent
Yashima et al.

(10) Patent No.: US 9,028,684 B2
(45) Date of Patent: May 12, 2015

(54) SEPARATING AGENT FOR OPTICAL ISOMER

(75) Inventors: Eiji Yashima, Nagoya (JP); Kazumi Tamura, Himeji (JP)

(73) Assignees: DAICEL CHEMICAL INDUSTRIES, LTD., Osaka-shi, Osaka (JP); NATIONAL UNIVERSITY CORPORATION NAGOYA UNIVERSITY, Nagoya-shi, Aichi (JP)

( * ) Notice: Subject to any disclaimer, the term of this patent is extended or adjusted under 35 U.S.C. 154(b) by 38 days.

(21) Appl. No.: 13/138,673

(22) PCT Filed: Apr. 28, 2010

(86) PCT No.: PCT/JP2010/057581
§ 371 (c)(1),
(2), (4) Date: Sep. 15, 2011

(87) PCT Pub. No.: WO2010/126087
PCT Pub. Date: Nov. 4, 2010

(65) Prior Publication Data
US 2012/0007011 A1    Jan. 12, 2012

(30) Foreign Application Priority Data
Apr. 30, 2009  (JP) .................. 2009-110431

(51) Int. Cl.
*B01J 20/32* (2006.01)
*B01J 20/29* (2006.01)

(52) U.S. Cl.
CPC .............. *B01J 20/321* (2013.01); *B01J 20/29* (2013.01); *B01J 20/3204* (2013.01); *B01J 20/3219* (2013.01); *B01J 20/3274* (2013.01); *B01J 20/328* (2013.01)

(58) Field of Classification Search
CPC ...... B01J 20/29; B01J 20/3204; B01J 20/328; B01J 20/3219; B01J 20/3274; B01J 20/321
USPC ............ 210/635, 656, 198.2, 502.1; 502/404
See application file for complete search history.

(56) References Cited

U.S. PATENT DOCUMENTS

| | | | |
|---|---|---|---|
| 4,426,292 A * | 1/1984 | Wernick et al. ............... | 210/635 |
| 4,663,163 A * | 5/1987 | Hou et al. ..................... | 210/645 |
| 4,861,872 A * | 8/1989 | Okamoto et al. ............ | 536/18.7 |
| 5,051,185 A * | 9/1991 | Watanabe et al. ............ | 210/635 |

(Continued)

FOREIGN PATENT DOCUMENTS

| | | |
|---|---|---|
| JP | 60-142930 | 7/1985 |
| JP | 60-226831 | 11/1985 |
| JP | 2004-277410 | 10/2004 |

OTHER PUBLICATIONS

Wikipedia "Poly(p-phenylene vinylene)", Feb. 7, 2012, pp. 1-6.*

(Continued)

*Primary Examiner* — Ernest G Therkorn
(74) *Attorney, Agent, or Firm* — Flynn, Thiel, Boutell & Tanis, P.C.

(57) ABSTRACT

Disclosed is a separating agent for optical isomer which is excellent in optical separation ability. Specifically disclosed is a separating agent for optical isomer containing: an inclusion complex including a π-conjugated polymer in a polymer compound having a hydroxy group or an amino group; and a carrier, the inclusion complex being carried by the carrier.

8 Claims, 4 Drawing Sheets

(56) References Cited

U.S. PATENT DOCUMENTS

| | | | |
|---|---|---|---|
| 5,059,654 A * | 10/1991 | Hou et al. | 525/54.1 |
| 5,489,387 A * | 2/1996 | Namikoshi et al. | 210/635 |
| 5,543,506 A * | 8/1996 | Okamoto | 536/18.7 |
| 5,679,572 A * | 10/1997 | Okamoto et al. | 210/656 |
| 6,096,825 A * | 8/2000 | Garnier | 525/54.1 |
| 6,821,417 B2 * | 11/2004 | Yang et al. | 210/198.2 |
| 7,018,538 B2 * | 3/2006 | Leiser et al. | 210/635 |
| 7,048,858 B2 * | 5/2006 | Ihre | 210/656 |
| 2003/0080057 A1 * | 5/2003 | Yang et al. | 210/634 |
| 2004/0149660 A1 * | 8/2004 | Kasuya et al. | 210/656 |
| 2004/0238814 A1 * | 12/2004 | Mizusaki et al. | 257/40 |
| 2005/0065282 A1 * | 3/2005 | Ihre et al. | 525/54.1 |
| 2006/0219615 A1 * | 10/2006 | Okamoto et al. | 210/198.2 |
| 2012/0007011 A1 * | 1/2012 | Yashima et al. | 252/60 |

OTHER PUBLICATIONS

PTO 12-1601 Translation of Japan Patent No. 2004277410, Jan. 2012.*

Abstract of JP 2003-298067 Oct. 17, 2003.*

"Amylose-wrapped luminescent conjugated polymers", by M. Frampton et al, Chemical Comunications, No. 24, 2008, pp. 2797-2799.

"Chemical Modification of a Luminescent Poly(phenylenevinylene)-Amylose Composite", by K. Tamura et al, Macromolecules, vol. 41, No. 13, 2008, pp. 5065-5069.

Japanese Journal of Polymer Science and Technology, by I. Yamaguchi et al, vol. 57, No. 7, 2000, pp. 472-473.

Polymer Science and Technology, by M. Ikeda et al, vol. 54, No. 1, 2005, p. 516.

"Optical Resolution of Chiral Sulfinyl Compounds via β-Cyclodextrin Inclusion Complexes[1-2]", by M. Mikolajczyk et al, Journal of the American Chemical Society, vol. 100, No. 8, 1978, pp. 2510-2515.

"Chiral separation of barbiturates and hydantoins by reversed-phase high-performance liquid chromatography using a 25 or 50 mm short ODS cartridge col. via β-cyclodextrin inclusion complexes", by S. Eto et al, Journal of Chromatography, vol. 579, No. 2, 1992, pp. 253-258.

Chromatographia, by J. Debrowski et al, vol. 16, 1982, pp. 198-200.

"Inclusion Chromatography—Distinguishing Form of Molecule", by K. Fujimura, The Chemical Society of Japan Research Conference of Education of Chemicals, 1995, pp. 21-22 with partial English translation.

"Asymmetric Polymerization of Methacrylates", by Y. Okamoto et al, Journal of Synthetic Organic Chemistry, vol. 45, No. 8, 1987, pp. 792-804.

Polymer Preprints, by K. Tamura et al, vol. 58, No. 2, 2009, pp. 2623-2624.

Polymer Preprints, by K. Tamura et al, vol. 58, No. 1, 2009, p. 1600.

"A Luminescent Poly(phenylenevinylene)-Amylose Composite with Supramolecular Liquid Crystallinity", by M. Ikeda et al, Angewandte Chemie Intern. Edition, vol. 45, 2006, pp. 6491-6495.

Extended European Patent Office Search Report dated Jul. 28, 2014 (9 pages).

Polysaccharide derivatives as useful chiral stationary phases in high-performance liquid chromatography, by X. Chen et al, Pure and Applied Chemistry, vol. 79, No. 9, 2007, pp. 1561-1573.

* cited by examiner

SEPARATING AGENT FOR OPTICAL ISOMER

REFERENCE TO RELATED APPLICATIONS

This application is a 371 of PCT/JP2010/057581 filed Apr. 28, 2010

TECHNICAL FIELD

The present invention relates to a separating agent for optical isomers.

BACKGROUND ART

Optical resolution by chromatography has conventionally been attracting attention remarkably in various fields including analytical chemistry, organic chemistry, medicine, and pharmacy, and a large number of chiral stationary phases have been reported in the world. In particular, for example, an ester derivative or carbamate derivative obtained by chemically modifying cellulose or amylose as an optically active polymer serves as a chiral stationary phase having a high optical resolution ability, and a filler for chromatography using this derivative has been known to the public. A filler for chromatography using this polymer compound derivative is used in a state of being carried by a carrier such as silica gel for the purposes of, for example, increasing the ratio at which a column is filled with the filler, and improving the ease of handling and mechanical strength of the filler.

For example, Patent document 1 describes a filler for chromatography obtained by causing a carrier such as silica to carry a cellulose derivative containing an aromatic ring. In addition, Patent document 2 describes a filler for chromatography obtained by causing a carrier such as silica to carry a carbamate derivative of a polysaccharide such as amylose. An additional optical isomer separation ability has been requested of such technology.

Meanwhile, a π-conjugated polymer such as polyphenylenevinylene has been known as a functional substance having various functions, and it has been known that the polymer can be utilized as a conductive plastic through a chemical reaction such as oxidation or reduction. In particular, the polymer has been applied to a photoelectronic device such as an LED or a solar cell as well in recent years by taking advantage of its characteristics.

As the π-conjugated polymer hardly dissolves in a solvent in general, research has been conducted for solubilizing the π-conjugated polymer in a solvent to improve its operability while obtaining the characteristics of the polymer. As a result of this research, a technology involving including polyphenylenevinylene as the π-conjugated polymer in amylose to provide an inclusion complex has been established (Non Patent documents 1 and 2).

CITATION LIST

Patent document

Patent Document 1+JP 60-142930 A
Patent Document 2+JP 60-226831 A

Non Patent Document

Non-Patent Document 1+Angew. Chem. Int. Ed., 2006, 45, 6491-6495

Non-Patent Document 2+Macromolecules 2008, 41, 5065-5069

SUMMARY OF INVENTION

Technical Problem

An object of the present invention is to provide a separating agent for optical isomers having an excellent optical separation ability.

Solution to Problem

The present invention has been made in view of the above-mentioned circumstances, and the inventors of the present invention have conducted extensive studies. As a result, the inventors have found that a separating agent for optical isomers, as a result of the following, exerts an additionally high optical separation ability. The separating agent is obtained by causing a carrier to carry an inclusion complex including a π-conjugated polymer in a polymer compound. That is, the gist of the present invention is as described below.

(1) A separating agent for optical isomers, comprising: an inclusion complex including a π-conjugated polymer in a polymer compound having a hydroxy group or an amino group; and a carrier, the inclusion complex being carried by the carrier.

(2) A separating agent for optical isomers according to the item (1), in which the polymer compound is an optically active organic polymer compound.

(3) A separating agent for optical isomers according to the item (2), in which the above-mentioned optically active organic polymer compound is a polysaccharide.

(4) A separating agent for optical isomers according to the item (3), in which the above-mentioned polysaccharide is cellulose or amylose.

(5) A separating agent for optical isomers according to any one of the items (1) to (4), in which the above-mentioned π-conjugated polymer is polyphenylenevinylene, polyphenyleneethynylene, polyphenylene, polythiophene, polypyrrole, or polyacetylene.

(6) A separating agent for optical isomers according to the item (5), in which the polymer compound is amylose and the π-conjugated polymer is polyphenylenevinylene.

(7) A separating agent for optical isomers according to the item (6), in which the above-mentioned inclusion complex is obtained by polymerizing, in a solution in which amylose is dissolved, a monomer that produces a constitutional unit represented by the following formula (I) after the polymerization.

[Chem 1]

(I)

(8) A separating agent for optical isomers according to the item (7), in which the monomer that produces the unit represented by the formula (I) after the polymerization is p-xylylenebis(tetrahydrothiophenium)dichloride.

(9) A separating agent for optical isomers according to any one of the items (1) to (8), in which at least part of the hydroxy group or amino group of the above-mentioned polymer compound is modified with a compound having a functional group which acts on an optical isomer.

(10) A separating agent for optical isomers according to the item (9), in which the above-mentioned compound having a functional group which acts on an optical isomer is introduced through a urethane bond, a urea bond, an ester bond, or an ether bond.

(11) A separating agent for optical isomers according to the item (10), in which the above-mentioned compound having a functional group which acts on an optical isomer is a compound that produces an atomic group represented by the following general formula (II) or (III) when introduced into the at least part of the hydroxy group or amino group of the polymer compound:

—CO—R'  (II)

—CO—NH—R'  (III)

in the formulae (II) and (III), R' represents an aliphatic or aromatic hydrocarbon group which may contain a heteroatom, and the aliphatic or aromatic hydrocarbon group may be unsubstituted or may be substituted with one or more groups selected from the group consisting of a hydrocarbon group which has 1 to 12 carbon atoms and which may contain a heteroatom, an alkoxy group which has 1 to 12 carbon atoms and which may contain a heteroatom, a cyano group, a halogen group, a hydroxy group, a nitro group, an amino group, and a dialkylamino group containing two alkyl groups each having 1 to 8 carbon atoms.

(12) A separating agent for optical isomers according to the item (11), in which the above-mentioned compound having a functional group which acts on an optical isomer includes 3,5-dimethylphenyl isocyanate.

Advantageous Effects of Invention

According to the present invention, there can be provided a separating agent for optical isomers having an excellent optical resolution ability for a specific compound, e.g., optical resolution for an amide compound.

DESCRIPTION OF EMBODIMENTS

Hereinafter, the present invention is described in detail.

A separating agent for optical isomers of the present invention (which may hereinafter be referred to as "separating agent of the present invention") is characterized in that an inclusion complex including a π-conjugated polymer in a polymer compound having a hydroxy group or an amino group is carried by a carrier.

That is, the separating agent for optical isomers of the present invention has a carrier and an inclusion complex of a π-conjugated polymer, which is carried by the carrier. The inclusion complex has the π-conjugated polymer and a polymer compound in which the polymer is included. The polymer compound may be a polymer compound having a hydroxy group or an amino group, may be a polymer compound obtained by modifying at least part (part or the entirety) of the hydroxy groups or amino groups of the polymer compound with a compound having a functional group that acts on an optical isomer, or may contain both of these compounds.

<Polymer Compound Used in the Production of the Separating Agent of the Present Invention>

The above-mentioned polymer compound to be used in the production of the separating agent of the present invention is preferably an optically active organic polymer compound having a hydroxy group or an amino group in the molecule at 20 to 40 wt % per molecule, more preferably a polysaccharide. Any one of the natural polysaccharides, synthetic polysaccharides, and natural product-denatured polysaccharides can be preferably used as the above-mentioned polysaccharide as long as the polysaccharide to be used has chirality. Of those, a polysaccharide in which monosaccharides are regularly bonded to each other is suitable because the polysaccharide can additionally improve the ability of the agent to separate optical isomers.

Examples of the above-mentioned polysaccharide include β-1,4-glucan (cellulose), α-1,4-glucan (amylose, amylopectin), α-1,6-glucan (dextran), β-1,6-glucan (pustulan), β-1,3-glucan (cardran, schizophyllan), α-1,3-glucan, β-1,2-glucan (Crown Gall polysaccharide), β-1,4-galactan, β-1,4-mannan, α-1,6-mannan, β-1,2-fructan (inulin), β-2,6-fructan (levan), β-1,4-xylan, β-1,3-xylan, β-1,4-chitosan, β-1,4-N-acetylchitosan (chitin), pullulan, agarose, alginic acid, α-cyclodextrin, β-cyclodextrin, γ-cyclodextrin, and starches each containing amylose.

Of the above-mentioned polysaccharides, preferred are cellulose, amylose, ρ-1,4-chitosan, chitin, ρ-1,4-mannan, β-1,4-xylan, inulin, and cardran, for each of which a polysaccharide having a high purity can be easily obtained. More preferred are cellulose and amylose.

The number average degree of polymerization of the polysaccaride (average number of the pyranose or furanose rings contained in one molecule) is preferably 5 or more, more preferably 10 or more. Though there is no particular upper limit, the number average degree of polymerization is preferably 1,000 or less from the viewpoint of easy handling, more preferably 5 to 1,000, still more preferably 10 to 1,000, particularly preferably 10 to 500.

<Inclusion Complex Used in Production of Separating Agent of the Present Invention>

The inclusion complex used in the separating agent for optical isomers of the present invention is such that the π-conjugated polymer to be described later is taken (included) in a cavity present in a molecule of the polymer compound by an intermolecular force.

The π-conjugated polymer included in the inclusion complex used in the production of the separating agent of the present invention is a polymer having π electrons spread in its entire molecular structure. The π-conjugated polymer has a linear, rigid polymer skeleton and a strong intermolecular interaction, and may affect the placement of the polymer compound in the inclusion complex. Examples of such π-conjugated polymer include polyphenylenevinylene, polyphenyleneethynylene, polyphenylene, polythiophene, polypyrrole, and polyacetylene. Of those, polyphenylenevinylene is particularly preferred. The molecular weight of the π-conjugated polymer included in the inclusion complex used in the production of the separating agent of the present invention is preferably one thousand or more, particularly preferably several thousand or more, though the preferred value varies depending on the kind and molecular weight of the polymer compound in which the polymer is included. In addition, although it is difficult to determine an accurate value for the molecular weight (number average molecular weight) by analysis, an approximate value for the molecular weight can be measured with a gel permeation chromatography apparatus and polystyrene as a standard substance in the case where the polymer dissolves in a solvent, or the molecular weight is directly measured by matrix-assisted laser desorption/ionization time-of-flight mass spectrometry (MALDI-TOF MS).

It should be noted that the category of the above-mentioned π-conjugated polymer comprehends a polymer containing, in a molecule of the π-conjugated polymer, a precursor portion as a constitutional unit at the time of the polymerization of the π-conjugated polymer.

When the π-conjugated polymer contains the constitutional unit of the precursor portion, the abundance ratio of the constitutional unit of the precursor portion is preferably 5 mol % or less, more preferably 1 mol % or less with respect to the entire constitutional units of the π-conjugated polymer.

The above-mentioned inclusion complex can be obtained by, for example, polymerizing, in a solution in which the above-mentioned polymer compound has been dissolved in advance, a monomer that forms the π-conjugated polymer in the inclusion complex. The solution in which the above-mentioned polymer compound has been dissolved can be obtained by dissolving the polymer compound in, for example, dimethyl sulfoxide (DMSO), pyridine, or N,N-dimethylformamide (DMF).

The above-mentioned monomer is, for example, a monomer that produces any one of the constitutional units represented by the following formulae (I) and (IV) to (VIII) after the polymerization.

Chem 2

(I)

(IV)

(V)

(VI)

(VII)

(VIII)

When the π-conjugated polymer is polyphenylenevinylene, the monomer that produces any such constitutional unit as described above is, for example, p-xylylenebis(tetrahydrothiophenium)dichloride, which produces the constitutional unit represented by the above-mentioned formula (I). When the π-conjugated polymer is polyacetylene, the monomer is, for example, acetylene, which produces the constitutional unit represented by the above-mentioned formula (VIII).

Upon polymerization of the monomer that forms the above-mentioned π-conjugated polymer, the monomer is preferably polymerized under the following condition because the inclusion of the π-conjugated polymer in the above-mentioned polymer compound is performed with high efficiency. The solution containing the above-mentioned polymer compound is made strongly basic with a basic substance such as an aqueous solution of NaOH. The pH of the solution at the time of the polymerization is preferably 7 or more, particularly preferably 10 or more.

When the π-conjugated polymer included in the above-mentioned inclusion complex is polyphenylenevinylene, for example, p-xylylene-bis(tetrahydrothiophenium)dichloride is used as the monomer that forms the above-mentioned π-conjugated polymer, and the polymerization is performed by charging an aqueous solution of the monomer into the solution containing the above-mentioned polymer compound.

An abundance ratio between the polymer compound and the monomer that produces the π-conjugated polymer in the solution upon production of the above-mentioned inclusion complex is preferably 90:10 to 95:5 in terms of a molar ratio from the viewpoint of the solubility of the inclusion complex, and is particularly preferably 90:10 to 92:8.

The presence of the inclusion complex carried by the carrier of the separating agent of the present invention can be confirmed by means of, for example, an infrared spectrometer, a fluorescence spectrometer, solid NMR, or elemental analysis.

<Compound Having Functional Group that Acts on Optical Isomer Used in Separating Agent of the Present Invention>

At least part of the hydroxy groups or amino groups of the above-mentioned polymer compound are preferably modified with a compound having a functional group which acts on an optical isomer.

The above-mentioned functional group is a functional group which acts on an optical isomer in a sample containing optical isomers to be separated. The action of the functional group on the optical isomer, which cannot be uniquely defined because the kind of the functional group varies depending on the kinds of the optical isomers to be separated, is not particularly limited as long as the action suffices for the optical resolution of the above-mentioned optical isomers with the above-mentioned polymer compound. Examples of the above-mentioned functional group include a group containing an aromatic group which may have a substituent, and an aliphatic group having a cyclic structure. The above-mentioned aromatic group can contain a heterocyclic ring or a condensed ring. The aromatic group may be a monocyclic one or a condensed polycyclic one, and is preferably a monocyclic or bicyclic one. Examples of the substituent which the above-mentioned aromatic group may have include an alkyl group having up to about 8 carbon atoms, a halogen group, an amino group, and an alkoxyl group. The above-mentioned functional group is selected in accordance with the kinds of the above-mentioned optical isomers to be separated.

In addition, the compound having a functional group which acts on an optical isomer is preferably introduced into the at least part of the hydroxy groups or amino groups of the above-mentioned polymer compound through a urethane bond, an ester bond, or an ether bond for a hydroxy group and a urea bond or an amide bond for an amino group. The compound is particularly preferably introduced through a urethane bond and a urea bond for a hydroxy group and an amino group, respectively. Therefore, the above-mentioned compound having a functional group which acts on an optical isomer is a compound having a functional group which can react with a hydroxy group or amino group of the above-mentioned polymer compound as well as the functional group which acts on an optical isomer. The above-mentioned compound having a functional group which can react with a hydroxy group or amino group may be an arbitrary compound as long as the compound is an isocyanic acid derivative, a carboxylic acid, an acid halide, an alcohol, or any other compound having reactivity with a hydroxy group or amino group.

It should be noted that the ratio of introduction of the above-mentioned compound having a functional group is preferably 90 to 100%, more preferably 97 to 100%, particularly preferably 100%. In addition, the position at which the above-mentioned compound having a functional group is introduced in the above-mentioned polymer compound is not particularly limited, and the position is appropriately selected in accordance with, for example, the kind of the functional group and the kind of the polymer compound.

In addition, the above-mentioned ratio of introduction (%) is defined as described below. That is, when the above-mentioned polymer compound has only a hydroxy group, the ratio of introduction is a numerical value obtained by multiplying a ratio of the number of hydroxy groups modified with the compound having a functional group that acts on an optical isomer to the total number of hydroxy groups of the polymer compound by 100. When the above-mentioned polymer compound has only an amino group, the ratio of introduction is a numerical value obtained by multiplying a ratio of the number of amino groups modified with the compound having a functional group that acts on an optical isomer to the total number of amino groups by 100. When the above-mentioned polymer compound has a hydroxy group and an amino group, the ratio of introduction is a numerical value obtained by multiplying a ratio of the sum of the numbers of hydroxy groups and amino groups modified with the compound having a functional group that acts on an optical isomer to the sum of the total number of hydroxy groups and the total number of amino groups by 100.

The above-mentioned compound having a functional group which acts on an optical isomer is preferably a compound that produces an atomic group represented by the following general formula (II) or (III).

—CO—R'  (II)

—CO—NH—R'  (III)

In the formulae (II) and (III), R' represents an aliphatic or aromatic hydrocarbon group having 1 to 3 ring(s) which may contain a heteroatom and which has 1 to 12 carbon atoms, and the hydrocarbon group may be unsubstituted or may be substituted with one or more groups selected from the group consisting of a hydrocarbon group which has 1 to 12 carbon atoms and which may contain a heteroatom, an alkoxy group which has 1 to 12 carbon atoms and which may contain a heteroatom, a cyano group, a halogen group, a hydroxy group, a nitro group, an amino group, and a dialkylamino group containing two alkyl groups each having 1 to 8 carbon atoms (i.e., a dialkylamino group whose alkyl groups each independently have 1 to 8 carbon atoms).

A monovalent aromatic hydrocarbon group represented by R' described above is, for example, a phenyl, naphthyl, phenanthryl, anthracyl, indenyl, indanyl, furyl, thionyl, pyrryl, benzofuryl, benzothionyl, indyl, pyridyl, pyrimidyl, quinolinyl, or isoquinolinyl group. In addition, a substituent for the monovalent aromatic hydrocarbon group represented by R' is, for example, an alkyl group having 1 to 12 carbon atoms, an alkoxy group having 1 to 12 carbon atoms, an alkylthio group having 1 to 12 carbon atoms, a cyano group, a halogen group, an acyl group having 1 to 8 carbon atoms, an acyloxy group having 1 to 8 carbon atoms, a hydroxy group, an alkoxycarbonyl group having 1 to 12 carbon atoms, a nitro group, an amino group, or a dialkylamino group containing two alkyl groups each having 1 to 8 carbon atoms. In addition, the aliphatic hydrocarbon group represented by R' described above is preferably an alicyclic compound the ring of which contains more than 3 members, or more preferably more than 5 members, or an alicyclic compound having a bridged structure. Of such groups, a cyclohexyl group, a cyclopentyl group, a norbornyl group, a cycloadamantylpentyl group, or the like is preferred. The aralkyl group represented by R' described above is, for example, a 1-phenylethyl group.

In the present invention, at least part of the hydroxy groups or amino groups of the above-mentioned polymer compound is preferably modified with one or more kinds selected from the group consisting of phenyl isocyanate, toluoyl isocyanate, ethylphenyl isocyanate, propylphenyl isocyanate, dimethylphenyl isocyanate, chlorophenyl isocyanate, fluorophenyl isocyanate, bromophenyl isocyanate, iodophenyl isocyanate, dichlorophenyl isocyanate, chloromethylphenyl isocyanate, 1-phenylethyl isocyanate, benzoyl chloride, methylbenzoyl chloride, chlorobenzoyl chloride, dimethylbenzoyl chloride, and dichlorobenzoyl chloride, particularly preferably modified with 3,5-dimethylphenyl isocyanate, 3,5-dichlorophenyl isocyanate, or 5-chloro-2-methylphenyl isocyanate.

A known method can be employed as a method of modifying a hydroxy group or amino group of the polymer compound with the compound having a functional group that acts on an optical isomer (which may be simply referred to as "compound having a functional group"). The method is, for example, as described below, but is not limited to the following description. A hydroxy group or amino group of the polymer compound is modified with the compound having a functional group whose amount corresponds to 105 to 150 mol % of the hydroxy groups or amino groups of the polymer compound in dimethylacetamide/lithium chloride/pyridine at 80 to 100° C. for 1 to 24 hours.

Although the operation is preferably performed on the inclusion complex including the above-mentioned π-conjugated polymer in the above-mentioned polymer compound in terms of ease of a reaction, the above-mentioned polymer compound may be subjected to the above-mentioned operation before the above-mentioned π-conjugated polymer is included.

<Carrier Used in Separating Agent of the Present Invention>

The separating agent for optical isomers of the present invention is such that the inclusion complex including the above-mentioned π-conjugated polymer in the above-mentioned polymer compound is carried by the carrier. The term "carried" as used herein refers to a state in which the above-mentioned inclusion complex is immobilized on the carrier by physical adsorption or by a chemical bond.

When the inclusion complex is caused to physically adsorb to the carrier, a conventionally known method can be employed. For example, the physical adsorption is performed by applying a solution in which the inclusion complex is dissolved to the carrier and then removing the solvent of the solution by distillation.

When the inclusion complex is chemically bonded to the carrier, a conventionally known method can be employed, and examples of the method include: a bond between the carrier and the above-mentioned polymer compound that constructs the inclusion complex; a bond between part of the above-mentioned polymer compound physically adsorbing to the carrier and the remainder of the above-mentioned polymer compound; and a chemical bond between the carrier and the above-mentioned polymer compound by a reaction with a crosslinking agent, a reaction with a radical generator, or the application of light (the application of a radiation such as a γ-ray or the application of an electromagnetic wave such as a microwave).

It should be noted that from the viewpoint of proper maintenance of the optical resolution ability of the separating agent including the carrier and the inclusion complex, the carrier is preferably caused to carry the inclusion complex at a weight ratio between the carrier and the inclusion complex of 90:10 to 60:40, and the weight ratio is more preferably 85:15 to 70:30. In addition, the abundance ratio can be adjusted by regulating the concentration of the inclusion complex in the solution containing the inclusion complex when causing the carrier to carry the inclusion complex.

A carrier of a known form can be used as the carrier. Examples of these carriers include a particulate carrier filled into a column tube and a porous, integral (cylindrical) carrier integrally stored in a column tube.

Examples of the above-mentioned carrier include a porous organic carrier and a porous inorganic carrier. Of those, a porous inorganic carrier is preferred. A polymer substance formed of, for example, polystyrene, polyacrylamide, or polyacrylate is suitably used as the porous organic carrier, and silica gel, alumina, magnesia, glass, kaolin, titanium oxide, a silicate, hydroxyapatite, zirconia, or the like is suitably used as the porous inorganic carrier.

Silica gel is a particularly preferred carrier, and the particles of silica gel each have a particle size of 1 μm to 100 μm, preferably 3 μm to 50 μm, more preferably 3 μm to 30 μm, and have an average pore size of 1 nm to 4,000 nm, preferably 3 nm to 500 nm. The surface of the silica gel, which is desirably treated in order that an influence of remaining silanol may be eliminated, may not be treated at all. The surface treatment is, for example, a silane treatment with aminopropyltriethoxysilane or the like.

The separating agent for optical isomers of the present invention can be used also as a filler for a capillary column for gas chromatography or electrophoresis, or particularly capillary electrochromatography (CEC), capillary zone electrophoresis (CZE), or micellar electrokinetic chromatography (MEKC).

<Optical Resolution Ability of Separating Agent for Optical Isomers of the Present Invention>

The inventors of the present invention consider the factor by which the separating agent for optical isomers of the present invention exerts a better optical resolution ability than that of a conventional separating agent as described below. That is, the inventors of the present invention consider that the exertion is attributable to the occurrence of a limited interaction between the separating agent and a chiral molecule like a relationship between a key and a keyhole through the following. The inclusion of a rigid π-conjugated polymer in a polymer compound such as a polysaccharide makes the above-mentioned polymer compound extremely rigid, and as a result, the mobility of the main chain or side chain of the polymer compound such as a polysaccharide that has been conventionally flexible reduces to such an extent that, for example, the position of a hydrogen bond site of the separating agent which may interact with the chiral molecule is strictly fixed.

EXAMPLES

Hereinafter, the present invention is described in more detail by way of examples. However, it goes without saying that the scope of the present invention is not limited to the examples. In addition, amylose used in each of the following examples and the like is a commercially available amylose (having a degree of polymerization of 200 to 300), and silica gel used therein is an SP-1000-7-APSL (manufactured by Daiso Co., Ltd., pore size: 100 nm, particle size: 7 μm).

Example 1

(1) Synthesis of Amylose-Poly(Phenylenevinylene) Inclusion Complex (APPV)

408.4 mg (2.52 mmol) of amylose were dissolved in 40 mL of dried dimethyl sulfoxide (DMSO). 16 mL of a 0.018-mol/L aqueous solution of p-xylylene-bis(tetrahydrothiophenium)dichloride (monomer 1) were added to the resultant solution, and then the mixture was stirred at 25° C. for 5 minutes. 2.8 mL of a 1N aqueous solution of NaOH were added to the mixture, and then the whole was stirred at 0° C. for 30 minutes. After that, the resultant was stirred at 20° C. for an additional forty-eight hours. 2.8 mL of 1N HCl were added to the resultant, and then the resultant reaction solution was centrifuged for 1 hour, followed by the dropping of the supernatant to acetone. The resultant precipitate was recovered by centrifugal separation, and was then dried with a vacuum pump overnight. Thus, 254.1 mg of an amylose-poly(phenylenevinylene) inclusion complex (APPV) were obtained (in 58% yield).

Figure 1:
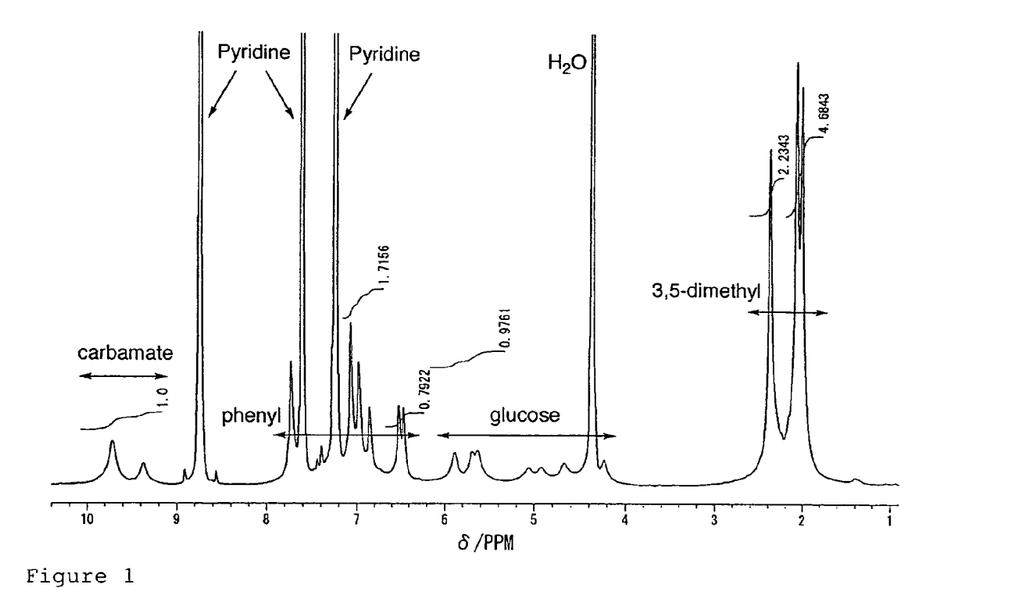
FIG. 1 is a view showing the $^1$H-NMR spectrum of an amylose-poly(phenylenevinylene) inclusion complex into which a 3,5-dimethylphenylcarbamate group is introduced obtained in Example 1 at 70° C. in pyridine-$d_5$.

(2) Production of APPV into which 3,5-dimethylphenyl-carbamate group is introduced Dried dimethylacetamide (6.4 mL), dried pyridine (4.0 mL), and lithium chloride (105.6 mg, 2.5 mmol) were added to the APPV (199.5 mg, 1.15 mmol), and then the mixture was stirred well. After that, 3,5-dimethylphenyl isocyanate (0.80 mL, 8.50 mmol) was added in an amount of 2.5 equivalents with respect to hydroxy groups in a glucose ring unit to the mixture, and then the whole was subjected to a reaction at 80° C. The reaction was performed while its progress was confirmed by FT-IR. After a lapse of 18 hours, it was judged from the result of the FT-IR measurement that the reaction progressed in a substantially complete fashion, and then heating was terminated. The reaction solution was dropped into methanol, and then methanol insoluble matter was recovered by centrifugal separation. The recovered insoluble matter was dried with a vacuum pump overnight. Thus, 606.8 mg of the target APPV derivative (APPV-AD) represented by the following formula were obtained (in 86% yield). $^1$H-NMR measurement (with an AS500 manufactured by VARIAN) in heavy pyridine confirmed that a 3,5-dimethylphenyl-carbamate group was introduced at substantially 100% with respect to the hydroxy groups of the amylose. Various measured results are shown below. In addition, FIG. 1 shows the $^1$H-NMR spectrum of the APPV-AD.

[Chem 3]

<Measured Results of $^1$H-NMR and the Like>

Anal. Calcd for $(C_6H_7O_5)_{9.00}$ $(C_8H_6)_{0.99}$ $(C_{12}H_{15}ClS)_{0.01}$ $(C_9H_{10}NO)_{27}$: C, 66.18; H, 6.17; N, 6.83. Found: C, 66.27; H, 6.25; N, 7.08.

IR (KBr, cm$^{-1}$) 3323 ($v_{NH}$), 1720 ($v_{C=O}$);

$^1$H-NMR (500 MHz, pyridine-d$_5$, 70° C.) 9.71 (br, 2H, NH), 9.37 (br, 1H, NH), 7.72-6.46 (br, 9H, aromatic), 5.88, 5.63, 5.02-4.23 (br, 7H r, glucose protons), 2.36 (s, 6H, CH$_3$), 2.05 (s, 6H, CH$_3$), 1.99 (s, 6H, CH$_3$)

(3) Production of Separating Agent of the Present Invention

0.3 g of the APPV-AD dissolved in pyridine was uniformly applied to 1.2 g of silica gel treated with aminopropyl-triethoxysilane. After that, the solvent was removed by distillation under a reduced pressure. Thus, a separating agent for optical isomers in which the silica gel was caused to carry the APPV-AD was obtained. A column was produced by filling the separating agent into a stainless column measuring 25×0.20 (inner diameter) cm under pressure by a slurry packing method.

(4) Evaluation for Optical Resolution Ability

Fourteen kinds of racemic bodies 1 to 14, and fifteen kinds of racemic bodies 16, 18 to 22, 24, 25, and 27 to 33 shown below were optically resolved with the column (25° C.) obtained by the above-mentioned operations (PU-980, JASCO Corporation). Table 1 shows the results of the optical resolution of the racemic bodies 1 to 14. In addition, Table 2 shows the results of the optical resolution of the racemic bodies 16, 18 to 22, 24, 25, and 27 to 33.

[Chem 4]

-continued

31

32

33

The detection and identification of peaks were performed with a UV detector (UV-970, JASCO Corporation, 254 nm) and an optical rotation detector (OR-990, JASCO Corporation). It should be noted that the number of theoretical plates N was determined from the peak of benzene, and a time $t_0$ in which an eluent passed through the column was determined from the elution time of 1,3,5-tri-tert-butylbenzene.

It should be noted that the same conditions as those described above were used as conditions for HPLC, detectors, and the like used in evaluation for an optical resolution ability in each of the following comparative examples as well unless otherwise stated. The optical resolution results, and conditions of the liquid chromatography such as a mobile phase and a flow rate, of Example 1 are shown below. Values in the table are a capacity ratio k1' and a separation factor α, and a sign in parentheses represents the optical rotation of an enantiomer which was previously eluted.

(Conditions a)
    Column: 25×0.20 cm I.D
    Eluent: Hexane/2-propanol (90:10, v:v)
    Flow rate of eluent: 0.1 mL/min It should be noted that the capacity ratio k1' and the separation factor α are defined by the following equations. A capacity ratio and a separation factor were calculated in the following examples and comparative examples by using the same equations. The column of Example 1 described above had a number of theoretical plates of 1,300.

Capacity ratio k1'

$k1'=\{(\text{retention time of enantiomer})-(t_0)\}/t_0$   Math. 1

Separation factor α

α=(capacity ratio of enantiomer to be retained more strongly)/(capacity ratio of enantiomer to be retained more weakly)   Math. 2

Comparative Example 1

The racemic bodies 1 to 10 were optically resolved with a commercially available column (Chiral Pak (registered trademark) AD, manufactured by Daicel Chemical Industries Limited, 25×0.46 (inner diameter) cm) into which a separating agent obtained by causing silica gel to carry amylose tris(3,5-dimethylphenylcarbamate) represented by the following formula was filled in the same manner as in Example 1 in accordance with the conditions a except that the inner diameter of the column was different. The racemic bodies 11 to 33 were also optically resolved with the column in the same manner as in Example 1 in accordance with the following conditions b. Table 1 shows the results of the optical resolution of the racemic bodies 1 to 14. Table 2 shows the results of the optical resolution of the racemic bodies 15 to 33. The column of Comparative Example 1 had a number of theoretical plates of 8,000.

(Conditions b)
    Column: 25×0.46 cm I.D
    Eluent: Hexane/2-propanol (90:10, v:v)
    Flow rate of eluent: 0.5 mL/min

[Chem 6]

TABLE 1

| | Example 1 (APPV-AD[a]) | | Comparative Example 1 (Chiralpak AD) | |
|---|---|---|---|---|
| racemic body | k'₁ | α | k'₁ | α |
| 1 | 0.44 | ca. 1 (−) | 0.61 | ca. 1 (−) |
| 2 | 0.38 | 1.49 (+) | 0.53 | 1.58 (+) |
| 3 | 0.30 | 2.69 (+) | 0.42 | 3.04 (+) |
| 4 | 1.59 | 2.05 (+) | 2.65 | 2.24 (+) |
| 5 | 3.45 | 1.50 | 2.46 | 2.11 (−) |
| 6 | 2.13 | 1.15 (−) | 3.14 | 1.21 (−) |
| 7 | 0.68 | 1 | 0.93 | 1.12 (+) |
| 8 | 0.22 | ca. 1 (−) | 0.25 | ca. 1 (−) |
| 9 | 1.03 | 1 | 1.30 | 1.39 (+) |
| 10 | 2.08 | 3.17 (+) | 3.25 | 2.01 (+) |
| 11 | 1.18 | 1.44 (−) | 1.36[b] | 1.08 (+)[b] |
| 12 | 1.24 | 1.41 (−) | 1.46[b] | 2.01 (−)[b] |
| 13 | 1.03 | 3.28 (−) | 1.65[b] | 1.59 (−)[b] |
| 14 | 0.53 | 1.40 (−) | 0.78[b] | 1.63 (−)[b] |

TABLE 2

| racemic body | APPV-4C $k_1'$ | α | amylose-4C $k_1'$ | α | APPV-3, 5C $k_1'$ | α | amylose-3, 5C $k_1'$ | α |
|---|---|---|---|---|---|---|---|---|
| 1 | 0.49 | 1 | 0.77 | 1 | 0.77 | 1 | 0.66 | 1 |
| 2 | 0.33 | 1 | 1.02 | 1 | 0.40(+) | ca. 1 | 0.35(+) | ca. 1 |
| 3 | 0.31(−) | ca. 1 | 0.75 | 1.07 | 0.40(−) | ca. 1 | 0.34(−) | ca. 1 |
| 4 | 0.53 | 1 | 0.79 | 1 | 0.33 | 1 | 0.27 | 1 |
| 5 | 1.16(−) | ca. 1 | 1.24 | 1 | 1.42(−) | 1 | 1.08(−) | ca. 1 |
| 6 | 1.20(−) | ca. 1 | 2.67 | 1 | 1.16 | 1 | 0.96(−) | ca. 1 |
| 7 | 0.94(−) | ca. 1 | 2.33 | 1 | 1.17(−) | ca. 1 | 0.98(−) | ca. 1 |
| 8 | 0.49(−) | ca. 1 | 1.12 | 1.05 | 0.12(−) | ca. 1 | 0.10(−) | ca. 1 |
| 9 | 0.58(−) | ca. 1 | 1.20 | 1 | 0.44(−) | ca. 1 | 0.33(−) | ca. 1 |
| 10 | 0.33 | 1 | 0.42 | 1.22 | 0.24 | 1 | 0.21 | 1 |
| 11 | 0.24 | 1 | 0.28 | 1 | 0.26 | 1 | 0.20(−) | ca. 1 |
| 12 | 0.36 | 1 | 0.43(+) | ca. 1 | 0.31(+) | ca. 1 | 0.26(+) | ca. 1 |
| 13 | 0.24 | 1 | 0.33(−) | ca. 1 | 0.24 | 1 | 0.21 | 1 |
| 14 | 0.10 | 1 | 0.17 | 1 | 0.10 | 1 | 0.10 | 1 |
| 15 | 0.22 | 1 | 0.74 | 1 | 0.23 | 1 | 0.23 | 1 |
| 16 | 1.62(−) | 1.10(Rs: 0.28) | 2.10(−) | 1.16(Rs: 0.68) | 2.73(−) | 1.17(Rs: 0.33) | 2.39(−) | 1.19(Rs: 0.50) |
| 17 | 1.32 | 1 | 1.49 | 1 | 1.09(+) | ca. 1 | 0.90 | 1 |
| 18 | 0.28(+) | ca. 1 | 0.34 | 1 | 0.33 | 1 | 0.25(+) | ca. 1 |
| 19 | 0.53(−) | ca. 1 | 0.82(−) | ca. 1 | 0.11(−) | ca. 1 | 0.10(−) | ca. 1 |
| 20 | 0.26 | 1 | 0.34 | 1 | 0.35 | 1 | 0.32 | 1 |
| 21 | 0.83(−) | ca. 1 | 1.23 | 1 | 0.14(−) | ca. 1 | 0.14(−) | ca. 1 |
| 22 | 1.52 | 1 | 1.89 | 1 | 1.62(−) | ca. 1 | 1.31 | 1 |
| 23 | 5.35 | 1 | 19.61 | 1 | 4.29 | 1 | 3.42 | 1 |
| 24 | 0.17(+) | ca. 1 | 0.21(+) | ca. 1 | 0.16(+) | ca. 1 | 0.13(+) | ca. 1 |
| 25 | 0.80(+) | ca. 1 | 0.96(+) | ca. 1 | 1.17(−) | 1.07 | 1.01(−) | 1.07 |
| 26 | 0.39 | 1 | 0.44(+) | ca. 1 | 0.37 | 1 | 0.30(+) | ca. 1 |
| 27 | 0.41 | 1 | 1.76 | 1 | 0.36 | 1 | 0.30 | 1 |
| 28 | 0.81(+) | ca. 1 | 1.50 | 1.05 | 1.10(+) | ca. 1 | 0.93 | ca. 1 |

As is apparent from the results of Table 1, the separating agent of Example 1 has a high resolution ability for an amide compound, in particular, an amide compound having a three-membered ring.

In addition, as shown in Table 2, the column of the APPV-AD was able to optically resolve the racemic bodies 16, 22, and 31 as in the case of the ChiralPak AD, and showed a larger separation factor (α) for the racemic body 16 than the ChiralPak AD did. In addition, it was confirmed that the elution order for the racemic body 28 was reversed between the column of the APPV-AD and the ChiralPak AD. Thus, the APPV-AD was confirmed to show a stronger optical resolution ability for a specific compound than a separating agent carrying the same polysaccharide derivative did or to show an optical separation characteristic for a specific compound different from that of a separating agent carrying the same polysaccharide derivative.

Example 2

Production of APPV into which 4-chlorophenylcarbonyl Group is Introduced

Figure 2:
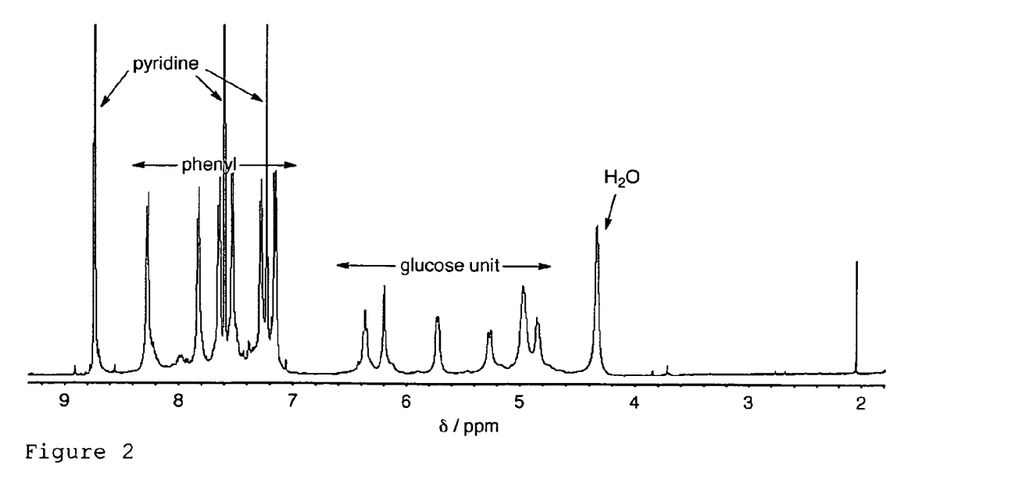
FIG. 2 is a view showing the $^1$H-NMR spectrum of an amylose-poly(phenylenevinylene) inclusion complex into which a 4-chlorobenzoate group is introduced obtained in Example 2 at 70° C. in pyridine-$d_5$.

Dried dimethylacetamide (5.5 mL), dried pyridine (3.4 mL), and lithium chloride (93 mg, 2.1 mmol) were added to the APPV (170 mg, 0.98 mmol), and then the mixture was stirred well. After that, 4-chlorobenzoyl chloride (1.2 mL, 6.8 mmol) was added in an amount of 7 equivalents with respect to hydroxy groups in a glucose ring unit to the mixture, and then the whole was subjected to a reaction at 75° C. The reaction was performed while its progress was confirmed by FT-IR. After a lapse of 38 hours, it was judged from the result of the FT-IR measurement that the reaction progressed in a substantially complete fashion, and then heating was terminated. The reaction solution was dropped to methanol, and then methanol insoluble matter was recovered by centrifugal separation. The recovered insoluble matter was dried with a vacuum pump overnight. Thus, 386.5 mg of the target APPV derivative (APPV-4C) represented by the following formula were obtained. $^1$H-NMR measurement (with an AS500 manufactured by VARIAN) in heavy pyridine confirmed that a 4-chlorobenzoate group was introduced at substantially 100% with respect to the hydroxy groups of the amylose. Various measured results are shown below. In addition, FIG. 2 shows the $^1$H-NMR spectrum of the APPV-4C.

Chem 7

<Measurement Results>

Anal. Calcd for $(C_6H_7O_5)_{9.00}$ $(C_8H_6)_{0.99}$ $(C_{12}H_{15}ClS)_{0.01}$ $(C_7H_4O_1Cl_1)_{27}$ $(H_2O)_3$: C, 56.26; H, 3.44. Found: C, 56.10; H, 3.16.

IR (KBr, cm$^{-1}$): 1727 ($\nu_{C=O}$)

$^1$H NMR (500 MHz, pyridine-d$_5$, 70° C.): δ 8.28 (d, 2H, aromatic), 7.84 (d, 2H, aromatic), 7.66 (d, 2H, aromatic), 7.53

(d, 2H, aromatic), 7.28 (d, 2H, aromatic), 7.14 (d, 2H, aromatic), 6.46-6.30, 6.26-6.06, 5.80-5.66, 5.40-5.14, 5.10-4.90, 4.90-4.68 (br, 7H, glucose protons).

A separating agent for optical isomers in which silica gel was caused to carry the APPV-4C was obtained by the same treatment as that of Example 1 except that the APPV-4C was used instead of the APPV-AD. A column was produced by filling the separating agent into a stainless column measuring 25×0.20 (inner diameter) cm under pressure by a slurry packing method.

Twenty-eight kinds of racemic bodies 1 to 28 were optically resolved with the column (25° C.) obtained by the above-mentioned operations in the same manner as in Example 1 in accordance with the conditions a. Table 3 shows the results of the optical resolution of the racemic bodies 1 to 28. The column of Example 2 has a number of theoretical plates of 1,500.

Example 3

Production of APPV into which 3,5-dichlorophenylcarbonyl Group is Introduced

Figure 3:
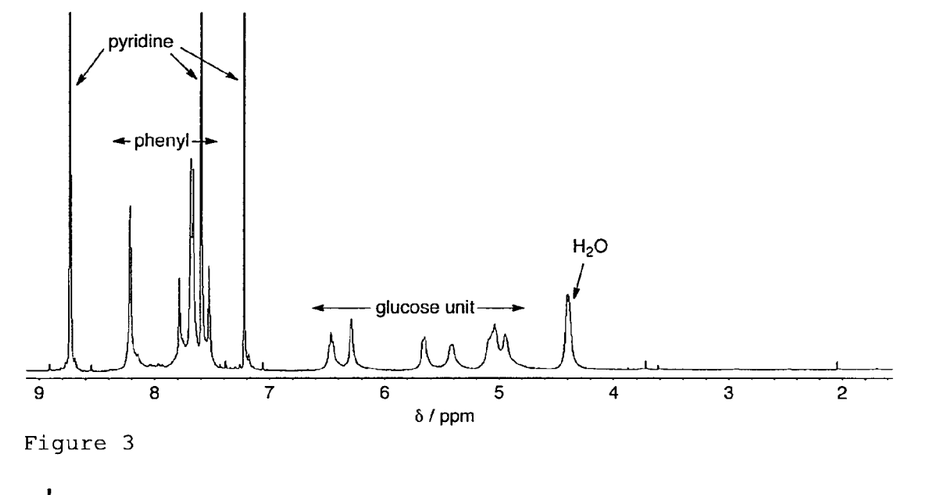
FIG. 3 is a view showing the $^1$H-NMR spectrum of an amylose-poly(phenylenevinylene) inclusion complex into which a 3,5-dichlorobenzoate group is introduced obtained in Example 3 at 70° C. in pyridine-$d_5$.

Dried dimethylacetamide (5.5 mL), dried pyridine (3.4 mL), and lithium chloride (93 mg, 2.1 mmol) were added to the APPV (170 mg, 0.98 mmol), and then the mixture was stirred well. After that, 3,5-dichlorobenzoyl chloride (1.2 mL, 5.7 mmol) was added in an amount of 6 equivalents with respect to hydroxy groups in a glucose ring unit to the mixture, and then the whole was subjected to a reaction at 75° C. The reaction was performed while its progress was confirmed by FT-IR. After a lapse of 38 hours, it was judged from the result of the FT-IR measurement that the reaction progressed in a substantially complete fashion, and then heating was terminated. The reaction solution was dropped to methanol, and then methanol insoluble matter was recovered by centrifugal separation. The recovered insoluble matter was dried with a vacuum pump overnight. Thus, 300.8 mg of the target APPV derivative (APPV-3,5C) represented by the following formula were obtained. $^1$H-NMR measurement (with an AS500 manufactured by VARIAN) in heavy pyridine confirmed that a 3,5-dichlorobenzoate group was introduced at substantially 100% with respect to the hydroxy groups of the amylose.

Various measured results are shown below. In addition, FIG. 3 shows the $^1$H-NMR spectrum of the APPV-3,5C.

Chem 8

<Measurement Results>

Anal. Calcd for $(C_6H_7O_5)_{9.00}$ $(C_8H_6)_{0.99}$ $(C_{12}H_{15}ClS)_{0.01}$ $(C_7H_3O_1Cl_2)_{27}$: C, 48.37; H, 2.43.

Found: C, 48.13; H, 2.42.

IR (KBr, cm$^{-1}$): 1736 ($\nu_{C=O}$).

$^1$H NMR (500 MHz, pyridine-d$_5$, 70° C.): δ 8.28 (d, 2H, aromatic), 7.80-7.46 (br, 7H, aromatic), 6.60-6.20, 5.76-5.30, 5.20-4.80 (br, 7H, glucose protons).

A separating agent for optical isomers in which silica gel was caused to carry the APPV-3,5C was obtained by the same treatment as that of Example 1 except that the APPV-3,5C was used instead of the APPV-AD. A column was produced by filling the separating agent into a stainless column measuring 25×0.20 (inner diameter) cm under pressure by a slurry packing method.

The twenty-eight kinds of racemic bodies 1 to 28 were optically resolved with the column (25° C.) of the APPV-3,5C obtained by the above-mentioned operations in accordance with the conditions a. Table 3 shows the results of the optical resolution of the racemic bodies 1 to 28. The column of Example 3 had a number of theoretical plates of 1,300.

TABLE 3

| racemic body | APPV-4C | | amylose-4C | | APPV-3, 5C | | amylose-3, 5C | |
|---|---|---|---|---|---|---|---|---|
| | $k_1'$ | α | $k_1'$ | α | $k_1'$ | α | $k_1'$ | α |
| 1 | 0.49 | 1 | 0.77 | 1 | 0.77 | 1 | 0.66 | 1 |
| 2 | 0.33 | 1 | 1.02 | 1 | 0.40(+) | ca. 1 | 0.35(+) | ca. 1 |
| 3 | 0.31(−) | ca. 1 | 0.75 | 1.07 | 0.40(−) | ca. 1 | 0.34(−) | ca. 1 |
| 4 | 0.53 | 1 | 0.79 | 1 | 0.33 | 1 | 0.27 | 1 |
| 5 | 1.16(−) | ca. 1 | 1.24 | 1 | 1.42(−) | 1 | 1.08(−) | ca. 1 |
| 6 | 1.20(−) | ca. 1 | 2.67 | 1 | 1.16 | 1 | 0.96(−) | ca. 1 |
| 7 | 0.94(−) | ca. 1 | 2.33 | 1 | 1.17(−) | ca. 1 | 0.98(−) | ca. 1 |
| 8 | 0.49(−) | ca. 1 | 1.12 | 1.05 | 0.12(−) | ca. 1 | 0.10(−) | ca. 1 |
| 9 | 0.58(−) | ca. 1 | 1.20 | 1 | 0.44(−) | ca. 1 | 0.33(−) | ca. 1 |
| 10 | 0.33 | 1 | 0.42 | 1.22 | 0.24 | 1 | 0.21 | 1 |
| 11 | 0.24 | 1 | 0.28 | 1 | 0.26 | 1 | 0.20(−) | ca. 1 |
| 12 | 0.36 | 1 | 0.43(+) | ca. 1 | 0.31(+) | ca. 1 | 0.26(+) | ca. 1 |
| 13 | 0.24 | 1 | 0.33(−) | ca. 1 | 0.24 | 1 | 0.21 | 1 |
| 14 | 0.10 | 1 | 0.17 | 1 | 0.10 | 1 | 0.10 | 1 |
| 15 | 0.22 | 1 | 0.74 | 1 | 0.23 | 1 | 0.23 | 1 |
| 16 | 1.62(−) | 1.10(Rs: 0.28) | 2.10(−) | 1.16(Rs: 0.68) | 2.73(−) | 1.17(Rs: 0.33) | 2.39(−) | 1.19(Rs: 0.50) |
| 17 | 1.32 | 1 | 1.49 | 1 | 1.09(+) | ca. 1 | 0.90 | 1 |
| 18 | 0.28(+) | ca. 1 | 0.34 | 1 | 0.33 | 1 | 0.25(+) | ca. 1 |

TABLE 3-continued

| racemic body | APPV-4C $k_1'$ | α | amylose-4C $k_1'$ | α | APPV-3, 5C $k_1'$ | α | amylose-3, 5C $k_1'$ | α |
|---|---|---|---|---|---|---|---|---|
| 19 | 0.53(−) | ca. 1 | 0.82(−) | ca. 1 | 0.11(−) | ca. 1 | 0.10(−) | ca. 1 |
| 20 | 0.26 | 1 | 0.34 | 1 | 0.35 | 1 | 0.32 | 1 |
| 21 | 0.83(−) | ca. 1 | 1.23 | 1 | 0.14(−) | ca. 1 | 0.14(−) | ca. 1 |
| 22 | 1.52 | 1 | 1.89 | 1 | 1.62(−) | ca. 1 | 1.31 | 1 |
| 23 | 5.35 | 1 | 19.61 | 1 | 4.29 | 1 | 3.42 | 1 |
| 24 | 0.17(+) | ca. 1 | 0.21(+) | ca. 1 | 0.16(+) | ca. 1 | 0.13(+) | ca. 1 |
| 25 | 0.80(+) | ca. 1 | 0.96(+) | ca. 1 | 1.17(−) | 1.07 | 1.01(−) | 1.07 |
| 26 | 0.39 | 1 | 0.44(+) | ca. 1 | 0.37 | 1 | 0.30(+) | ca. 1 |
| 27 | 0.41 | 1 | 1.76 | 1 | 0.36 | 1 | 0.30 | 1 |
| 28 | 0.81(+) | ca. 1 | 1.50 | 1.05 | 1.10(+) | ca. 1 | 0.93 | ca. 1 |

It should be noted that Rs in Table 3 represents a resolution and is determined from the following equation. In the following equation, $t_1$ represents the elution time of an optical isomer to be previously eluted, $t_2$ represents the elution time of an optical isomer to be eluted later, and $W_1$ and $W_2$ represent the peak widths of the peaks of the respective optical isomers.

$$Rs = 2(t_2 - t_1)/(W_1 + W_2)$$

Figure 4:
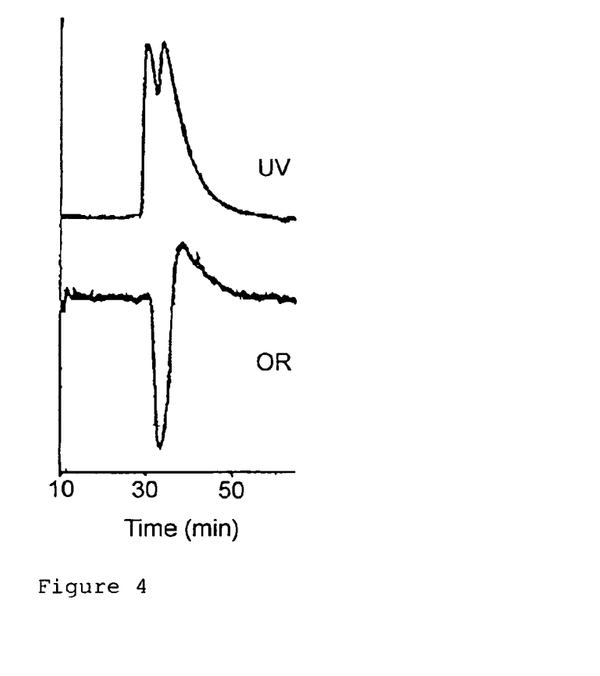
FIG. 4 is a view showing the UV chromatogram with a UV detector, and OD chromatogram with an optical rotation detector, of a racemic body 16 with a separating agent of the APPV-3,5C in Example 3 in tandem.
Figure 5:
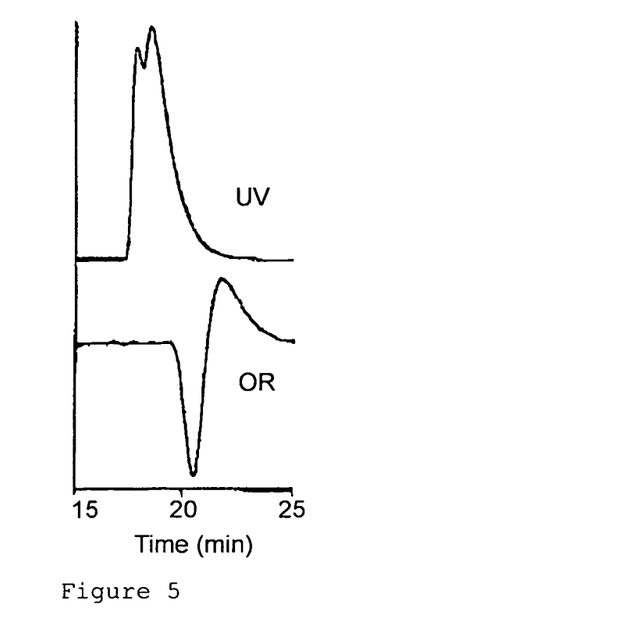
FIG. 5 is a view showing the UV chromatogram with a UV detector, and OD chromatogram with an optical rotation detector, of a racemic body 25 with the separating agent of the APPV-3,5C in Example 3 in tandem.

Further, FIGS. 4 and 5 show the UV spectra with a UV detector, and OR spectra with an optical rotation detector, of the racemic bodies 16 and 25 with the column of the separating agent of the APPV-3,5C, respectively.

Comparative Example 2

Amylose tris(4-chlorobenzoate) was uniformly applied instead of the APPV-AD to silica gel treated with aminopropyltriethoxysilane, and then the solvent was removed by distillation under a reduced pressure in the same manner as in Example 1. Thus, a separating agent for optical isomers (amylose-4C) in which the silica gel was caused to carry amylose tris(4-chlorobenzoate) was obtained. A column was produced by filling the separating agent into a stainless column measuring 25×0.20 (inner diameter) cm under pressure by a slurry packing method.

The racemic bodies 1 to 28 were optically resolved with the column (25° C.) of the amylose-4C obtained by the above-mentioned operations in accordance with the conditions a. Table 3 shows the results of the optical resolution. The column of Comparative Example 2 had a number of theoretical plates of 1,500.

Comparative Example 3

Amylose tris(3,5-dichlorobenzoate) was uniformly applied instead of the APPV-AD to silica gel treated with aminopropyl-triethoxysilane, and then the solvent was removed by distillation under a reduced pressure in the same manner as in Example 1. Thus, a separating agent for optical isomers (amylose-3,5C) in which the silica gel was caused to carry amylose tris(3,5-dichlorobenzoate) was obtained. A column was produced by filling the separating agent into a stainless column measuring 25×0.20 (inner diameter) cm under pressure by a slurry packing method.

The racemic bodies 1 to 28 were optically resolved with the column (25° C.) of the amylose-3,5C obtained by the above-mentioned operations in accordance with the conditions a. Table 3 shows the results of the optical resolution. The column of Comparative Example 3 had a number of theoretical plates of 1,600.

Figure 6:
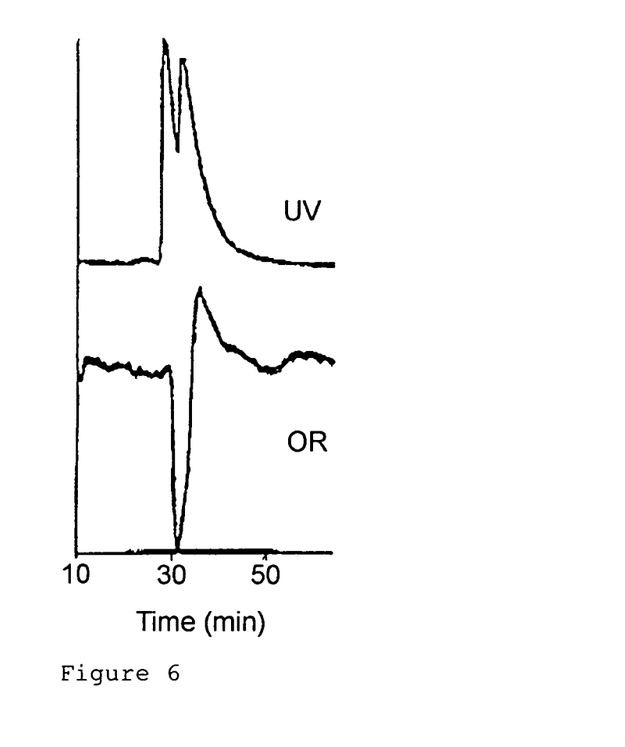
FIG. 6 is a view showing the UV chromatogram with a UV detector, and OD chromatogram with an optical rotation detector, of the racemic body 16 with a separating agent of the amylose-3,5C in Comparative Example 3 in tandem.
Figure 7:
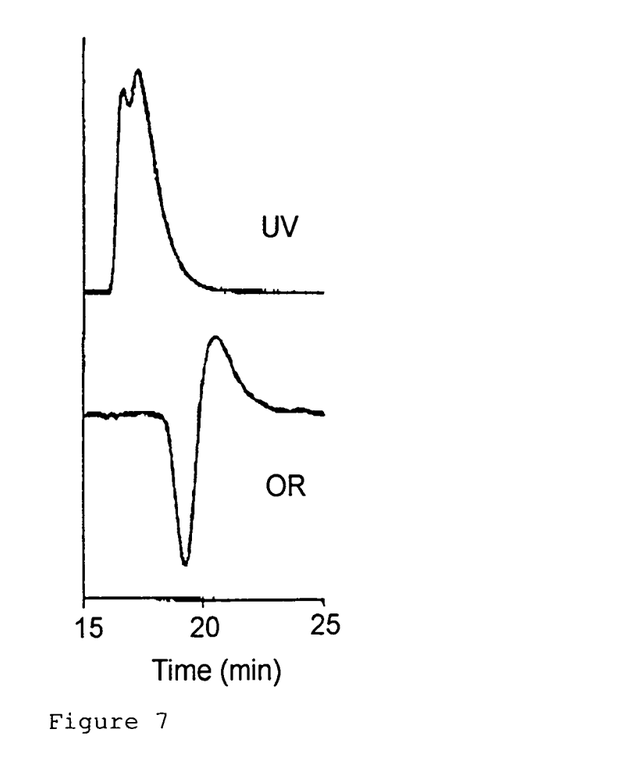
FIG. 7 is a view showing the UV chromatogram with a UV detector, and OD chromatogram with an optical rotation detector, of the racemic body 25 with the separating agent of the amylose-3,5C in Comparative Example 3 in tandem.

Further, FIGS. 6 and 7 show the UV spectra and OR spectra of the racemic bodies 16 and 25 with the column of the separating agent of the amylose-3,5C, respectively.

As shown in Table 3, the APPV-4C showed an optical resolution ability for the racemic body 16 as in the case of the amylose-4C. In addition, the APPV-3,5C showed an optical resolution ability for the racemic body 25 that had not been resolved with the APPV-AD and the Chiralpak AD as well as an optical resolution ability for the racemic body 16 as in the case of the amylose-3,5C. Thus, the APPV-3,5C in which the kind of the polysaccharide derivative was an ester derivative and a substituent of a phenyl group was chlorine was confirmed to have an optical separation characteristic different from that of the APPV-AD.

INDUSTRIAL APPLICABILITY

The optical resolution of optical isomers is a particularly important technology in the research and development of chiral drugs that act on living organisms. In the present invention, probably as a result of the inclusion of a π-conjugated polymer in a polymer compound such as a polysaccharide derivative, a more specific act on an optical isomer to be separated is obtained than that in the case of optical resolution with the polymer compound, and hence a separating agent having an optical resolution characteristic different from the optical resolution characteristic of the polymer compound is obtained. Therefore, the present invention is expected to largely contribute to: additional development of a method of separating optical isomers; and additional widespread use and discovery of useful optical isomers.

The invention claimed is:

1. A separating agent for optical isomers, comprising: an inclusion complex including a π-conjugated polymer in a polysaccharide, without a covalent bond between the π-conjugated polymer and the polysaccharide; and a carrier, the inclusion complex being carried by the carrier.

2. The separating agent for optical isomers according to claim 1, wherein the polymer compound is amylose and the π-conjugated polymer is polyphenylenevinylene.

3. The separating agent for optical isomers according to claim 2, wherein the inclusion complex is obtained by polymerizing, in a solution in which amylose is dissolved, a monomer that produces a constitutional unit represented by the following formula (I) after the polymerization (I)

4. The separating agent for optical isomers according to claim 3, wherein the monomer that produces the unit represented by formula (I) after the polymerization is p-xylylenebis(tetrahydrothiophenium)dichloride.

5. The separating agent for optical isomers according to claim 1, wherein at least part of the hydroxy group or amino group of the polysaccharide is modified with a compound having a functional group which acts on an optical isomer.

6. The separating agent for optical isomers according to claim 5, wherein the compound having a functional group which acts on an optical isomer is introduced through a urethane bond, a urea bond, an ester bond, or an ether bond.

7. The separating agent for optical isomers according to claim 6, wherein the compound having a functional group which acts on an optical isomer is a compound that produces an atomic group represented by the following general formula (II) or (III) when introduced into the at least part of the hydroxy group or amino group of the polysaccharide:

—CO—R' (II)

—CO—NH—R' (III)

wherein in the formulae (II) and (III), R' represents an aliphatic or aromatic hydrocarbon group, which may contain a heteroatom, and the aliphatic or aromatic hydrocarbon group may be unsubstituted or may be substituted with one or more groups selected from the group consisting of a hydrocarbon group which has 1 to 12 carbon atoms and which may contain a heteroatom, an alkoxy group which has 1 to 12 carbon atoms and which may contain a heteroatom, a cyano group, a halogen group, a hydroxy group, a nitro group, an amino group, and a dialkylamino group containing two alkyl groups, each alkyl group having 1 to 8 carbon atoms.

8. A separating agent for optical isomers according to claim 7, wherein the compound having a functional group which acts on an optical isomer is 3,5-dimethylphenyl isocyanate.

* * * * *